(12) United States Patent
Beckhoff et al.

(10) Patent No.: US 8,001,306 B2
(45) Date of Patent: Aug. 16, 2011

(54) INTERFACE UNIT AND COMMUNICATION SYSTEM HAVING A MASTER/SLAVE STRUCTURE

(75) Inventors: Hans Beckhoff, Verl (DE); Dirk Janssen, Verl (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 12/251,028

(22) Filed: Oct. 14, 2008

(65) Prior Publication Data

US 2009/0083464 A1 Mar. 26, 2009

Related U.S. Application Data

(63) Continuation of application No. PCT/EP2007/003591, filed on Apr. 24, 2007.

(30) Foreign Application Priority Data

Apr. 24, 2006 (DE) .......................... 10 2006 018 884

(51) Int. Cl.
G06F 13/00 (2006.01)
G06F 15/173 (2006.01)
H04L 12/42 (2006.01)
H04L 12/437 (2006.01)

(52) U.S. Cl. .................. 710/110; 710/306; 709/251
(58) Field of Classification Search .................. 710/110
See application file for complete search history.

(56) References Cited

U.S. PATENT DOCUMENTS

| | | | |
|---|---|---|---|
| 4,648,088 A | | 3/1987 | Cagle et al. |
| 4,745,597 A | * | 5/1988 | Morgan et al. ............. 370/224 |
| 6,005,869 A | * | 12/1999 | Sakai et al. ................. 370/452 |
| 7,065,039 B2 | * | 6/2006 | Ying ........................... 370/222 |
| 7,085,496 B2 | * | 8/2006 | Kinoshita et al. ............ 398/83 |
| 7,283,740 B2 | * | 10/2007 | Kinoshita et al. ............. 398/5 |
| 2004/0008719 A1 | * | 1/2004 | Ying ........................... 370/460 |
| 2004/0008720 A1 | | 1/2004 | Wang et al. |
| 2004/0008721 A1 | * | 1/2004 | Ying et al. .................. 370/460 |
| 2004/0177203 A1 | * | 9/2004 | Goodnow et al. ........... 710/305 |
| 2004/0208575 A1 | * | 10/2004 | Kinoshita et al. ............ 398/83 |
| 2004/0208576 A1 | * | 10/2004 | Kinoshita et al. ............ 398/83 |
| 2005/0088982 A1 | * | 4/2005 | Ying ........................... 370/294 |
| 2005/0129037 A1 | * | 6/2005 | Zumsteg et al. ............. 370/404 |

(Continued)

FOREIGN PATENT DOCUMENTS

GB 2 207 326 1/1989

(Continued)

OTHER PUBLICATIONS

International Search Report for PCT/EP2007/003591 dated Sep. 6, 2007.

(Continued)

*Primary Examiner* — Ryan M Stiglic
(74) *Attorney, Agent, or Firm* — Dorsey & Whitney LLP (57) ABSTRACT

An interface unit is provided for a communication system comprising a master unit and a plurality of slave units serially connecting the master unit via a double ring structure comprising a first communication path and a second communication path. The interface unit comprises a first switching unit, which is configured to output information signals received by the master unit as a first information signal to the first communication path and as a second information signal to the second communication path; and a second switching unit, which is configured to forward the first information signal circulating on the first communication path and second information signal circulating on the second communication path to the master unit.

29 Claims, 4 Drawing Sheets

U.S. PATENT DOCUMENTS

| | | | |
|---|---|---|---|
| 2006/0092858 A1* | 5/2006 | Kynast et al. | 370/254 |
| 2006/0114943 A1* | 6/2006 | Kynast et al. | 370/509 |
| 2006/0136604 A1* | 6/2006 | Schultze et al. | 709/251 |
| 2007/0143510 A1* | 6/2007 | Schultze | 710/100 |
| 2007/0183319 A1* | 8/2007 | Rug et al. | 370/228 |
| 2007/0192449 A1* | 8/2007 | Schultze et al. | 709/220 |
| 2007/0274208 A1* | 11/2007 | Harter et al. | 370/223 |
| 2008/0170495 A1* | 7/2008 | Monse et al. | 370/223 |

FOREIGN PATENT DOCUMENTS

| | | |
|---|---|---|
| WO | 89/11187 | 11/1989 |
| WO | WO 2004/084451 | 9/2004 |

OTHER PUBLICATIONS

Examination report for German application No. 10 2006 018 884.5-31, dated Dec. 13, 2006.

* cited by examiner

Fig. 2

INTERFACE UNIT AND COMMUNICATION SYSTEM HAVING A MASTER/SLAVE STRUCTURE

CROSS-REFERENCE TO RELATED APPLICATION(S)

This application is a continuation of International Patent Application No. PCT/EP2007/003591, filed on Apr. 24, 2007, which claims priority to German Application No. 10 2006 018 884.5-31, filed on Apr. 24, 2006, the contents of which are hereby incorporated in their entirety by reference herein.

FIELD

The present invention relates to an interface unit for a communication system having a master-slave structure, in which the interface unit connects a plurality of slave units to each other by means of a contra-sense double ring structure, as well as to such a communication system having a master-slave structure.

BACKGROUND

In production and automation technology, serial bus systems are increasingly used in which the remotely arranged devices of machine peripherals such as I/O modules, transducers drives, valves and operator terminals communicate with automation, engineering and visual display systems via an efficient real-time communication system. In this arrangement, all users are networked via a serial bus, for example via a field bus, the data exchange via the bus being in general carried out on the basis of the master-slave principle.

The active bus users on the bus system, the control devices, as a rule, possess a bus access authorization and determine the data transfer on the bus. The active bus users are called the master units in the serial bus system. In contrast, passive bus users are, as a rule, machine peripheral devices. They do not receive a bus access authorization, i.e. they are allowed to acknowledge only received information signals or transfer information signals to a master unit upon request by the latter. Passive bus users are called slave units in the serial bus system.

To avoid complex cabling, field bus systems having a master-slave structure are generally arranged in ring topology, all bus users being connected to a ring-shaped transmission path. An information signal generated by the master unit is fed into the ring-shaped transmission path by the master unit and successively passes through the slave units serially connected to the ring-shaped transmission path and is then received again and evaluated by the master unit. Master-slave systems can also be designed as multi-master systems.

As a rule, the information signals are organized by the master unit into data packets which are composed of control data and useful data, for example using the Ethernet standard which provides for data packets having a length of up to 1500 bytes with a transmission speed which, at the same time, may be as high as 100 Mbit/sec. Each of the slave units connected to the ring-shaped transmission path exchanges the useful data intended for it with the Ethernet message when the Ethernet message fed in by the master unit passes through on the ring-shaped transmission path.

As a rule, the master-slave communication systems having a ring structure are configured in such a manner that the master unit has a transmitting unit as data injection point and a receiving unit as data extraction point. The individual slave units are then connected together on the transmission path to form a chain, wherein each user is connected to two neighbors and the first and last user in the chain is connected to the master unit. The data packets are transmitted in one direction starting from the master unit via its transmitting unit to the first connected slave unit and from there to the next one, until the last slave unit in the chain has been reached, and then back to the receiving unit of the master unit. Each slave unit has, for receiving the circulating data packets from the previous user, an interface with a receiving unit and, for forwarding to the following user, an interface with a transmitting unit, a processing unit being arranged between receiving and transmitting unit in order to process the data packets passing through the slave unit, i.e. to exchange the useful data allocated to the slave unit with the data packets.

Herein, the ring-shaped communication systems with master-slave structure are often designed in such a manner that the master unit forms a physical line with the slave units arranged at it, the transmission medium having a double-line structure and each slave unit having two ports with a combined transmitting/receiving unit, transmitting and receiving unit being short-circuited in the output port of the last slave unit in the transmission chain. The data packets injected into the first line by the master unit via its receiving unit are processed by the slave units on the forward path and are then simply forwarded only to the receiving unit of the master unit on the return path via the second line.

A central requirement for master-slave communication systems, particularly when they are used in production and process automation, is a high fault tolerance, that is to say the capability of the communication system to maintain the required function, i.e., for example, the production of a workpiece, in spite of the occurrence of faults. In this context, faults in the communication system which must be overcome without impairment of the process are, in addition to faults in the data packets, also the failure of entire transmission links, in particular, for example due to physical separation of the transmission medium.

To achieve a fault-tolerant master-slave communication system, particularly in the case of link faults, i.e. in the case of the failure of entire transmission sections, contra-sense double-ring structures are frequently used. Fault-tolerant master-slave communication systems having a double-ring structure, in which the master unit comprises two respective transmitting and receiving units comprising the corresponding transmitters or receivers, respectively, as well as associated control units in order to output data packets to the two communication paths, cause high hardware and switching complexity of the master unit and thus considerably increase costs. This also applies to the slave units which each comprise two processing units for processing the data packets passing through. Furthermore, in normal operation each slave unit must decide which of the two data packets passing through the two processing units are to be used for device control which greatly restricts the use of such communication systems at the required high data transmission rates. In addition, the known fault-tolerant communication systems with double-ring topology require that the master unit responds separately to a link fault and switches from normal mode into fault mode.

SUMMARY

One embodiment provides an interface unit for a communication system comprising a master unit and a plurality of slave units serially connecting the master unit via a double ring structure comprising a first communication path and a second communication path. The interface unit comprises a first switching unit, which is configured to output information signals received by the master unit as a first information signal to the first communication path and as a second information signal to the second communication path; and a second switching unit, which is configured to forward the first information signal circulating on the first communication path and second information signal circulating on the second communication path to the master unit.

Another embodiment provides a communication system comprising a master unit, a plurality of slave units, a double ring structure comprising a first communication path and a second communication path, and an interface unit for serially connecting the master unit to a plurality of slave units via the double ring structure. The master unit comprises a transmitting unit for transmitting information signals and a receiving unit for receiving information signals. The interface unit comprises a first switching unit, the input of which is connected to the transmitting unit of the master unit, the first output of which is connected to the first communication path and the second output of which is connected to the second communication path, and a second switching unit, the first input of which is connected to the first communication path, the second input of which is connected to the second communication path and the output of which is connected to the receiving unit of the master unit. Each slave unit comprises a processing unit for processing information signals. The master unit is configured to transmit two information signals having an identical data field, which may be provided with an associated data area for each connected slave unit, and a different address field to the first switching unit of the interface unit via the transmitting unit. The first switching unit of the interface unit is configured to output the one information signal to the first communication path and the other information signal to the second communication path on the basis of the contents of the address field. The processing unit of each slave unit is configured to process the associated data area of the one information signal circulating on the first communication path or the associated data area of the other information signal circulating on the second communication path. The second switching unit of the interface unit is configured to successively forward the two information signals circulating in contra-sense on the first communication path and on the second communication path to the receiving unit of the master unit. The master unit is configured to superimpose the data fields of the two information signals received by the receiving unit.

Another embodiment provides a communication system comprising a master unit, a plurality of slave units, a double ring structure comprising a first communication path and a second communication path, and an interface unit for serially connecting the master unit to a plurality of slave units via the double ring structure. The master unit comprises a transmitting unit for transmitting information signals and a receiving unit for receiving information signals. The interface unit comprises a first switching unit, the input of which is connected to the transmitting unit of the master unit, the first output of which is connected to the first communication path and the second output of which is connected to the second communication path, and a second switching unit, the first input of which is connected to the first communication path, the second input of which is connected to the second communication path and the output of which is connected to the receiving unit of the master unit. Each slave unit comprises a processing unit for processing information signals. The master unit is configured to send an information signal having a data field, which provides an associated data area for each connected slave unit to the first switching unit of the interface unit via the transmitting unit. The first switching unit of the interface unit is configured to duplicate the information signal received by the master unit and to output the one information signal to the first communication path and the other information signal to the second communication path. The processing unit of each slave unit is configured to process the associated data area of the one information signal circulating on the first communication path or the associated data area of the other information signal circulating on the second communication path. The second switching unit of the interface unit is configured to successively forward the two information signals circulating in contra-sense on the first communication path and on the second communication path to the receiving unit of the master unit. The master unit is configured to superimpose the data fields of the two information signals received by the receiving unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a schematic view of an inventive communication system having a master slave structure in which an interface unit is provided between the master unit and the slave unit serially connected within a double ring structure, wherein

DETAILED DESCRIPTION OF THE PREFERRED EMBODIMENT

In automation technology, field bus systems are increasingly used in which devices of the machine peripherals, arranged in distributed manner, communicate with automation, engineering and visual display systems via a field bus. As a rule, the field bus system has a serial bus which can be, for example, an electrical line, an optical waveguide or a radio cable. All bus users are then connected to this field bus, a distinction being made between active bus users and passive bus users. The active bus users on the field bus system are the master units which determine the data traffic on the bus. Such a master unit is, for example, an industrial PC which is used as process control computer in a production process. This master unit has a bus access authorization and can output data to the field bus without external request. The passive bus users on the bus system are peripheral machine devices, for example I/O devices, valves, drives and transducers. They are used as slave units and do not obtain a bus access authorization, i.e. they are allowed to acknowledge only received information signals or to transmit information signals to a master unit on request by the latter.

The communication standard used for data transmission in the master-slave system is for example the Ethernet concept. In Ethernet communication systems, the data to be transmitted are encapsulated in data packets, also called messages in the further text, having a predetermined format. The Ethernet messages can have a data length of up to 1500 bytes containing, additionally to the useful data, control data which have a start identifier, a destination and source address, the data packet type and a fault mechanism.

Ethernet communication systems having a master-slave structure may be designed in such a manner that the individual slave units are connected together via the transmission medium to form a chain, each slave unit being connected to two neighbors and the first and the last user in the chain being connected to the master unit so that a ring structure is obtained. In this arrangement, the data are transmitted in one direction starting from the master unit to the first adjacent slave unit and from there to the next one as far as the last slave unit and then back to the master unit.

To ensure high fault tolerance, particularly in the case of a link fault in the communication system, i.e. the failure of entire transmission sections with slave units, e.g. due to a cable break, the communication systems having a master-slave structure often have two communication paths which operate in contra-sense direction to one another. Due to the double-ring structure operating in contra-sense, the possibility exists in the case of link faults to carry out reconfiguration measures in the communication system in order to maintain the performance of the communication system in spite of link faults.

FIG. 1 shows such a fault-tolerant communication system according to an embodiment according to the invention in a basic circuit diagram. The communication system comprises a master unit 1 which is connected serially to N slave units 3 via an interface unit 4 having a double ring structure 2. The double ring structure 2 comprises two unidirectional communication paths 21, 22 which pass through the associated slave units 3 in contra-sense direction.

The interface unit 4 comprises a first switching unit 41 and a second switching unit 42. The first switching unit 41 is connected to a transmitting unit TX11 of the master unit 1 via an input 411. A first output 412 of the first switching unit 41 is connected to the first communication path 21 and a second output 413 of the first switching unit 41 is connected to the second communication path 22. The second switching unit 42 of the interface unit 41 is connected to the first communication path 21 via a first input 421 and to the second communication path 22 via a second input 422. The output 423 of the second switching unit 42 of the interface unit 4 is connected to a receiving unit RX12 of the master unit 1. The transmitting unit 11 of the master unit 1 is connected to a transmission control unit 16 via a first control line 15. The receiving unit 12 is connected to a receiving control unit 18 via a second control line 17.

Each slave unit 3 comprises an interface comprising a first receiving unit RX31 for receiving Ethernet messages from a preceding user via the first communication path 21 and an interface with a first transmitting unit TX32 for forwarding to the next user via the first communication path 21. Furthermore, each slave unit 3 comprises an interface with a second receiving unit RX33 for receiving a circulating Ethernet message via the second communication path 22 from a preceding user and an interface with a second transmitting unit TX34 for forwarding to the next user. In each slave unit 3, a processing unit 35 and an actuable coupling unit 37 is furthermore connected between the first receiving unit RX31, the second receiving unit RX32, the first transmitting unit TX33 and the second transmitting unit TX34.

Figure 2:
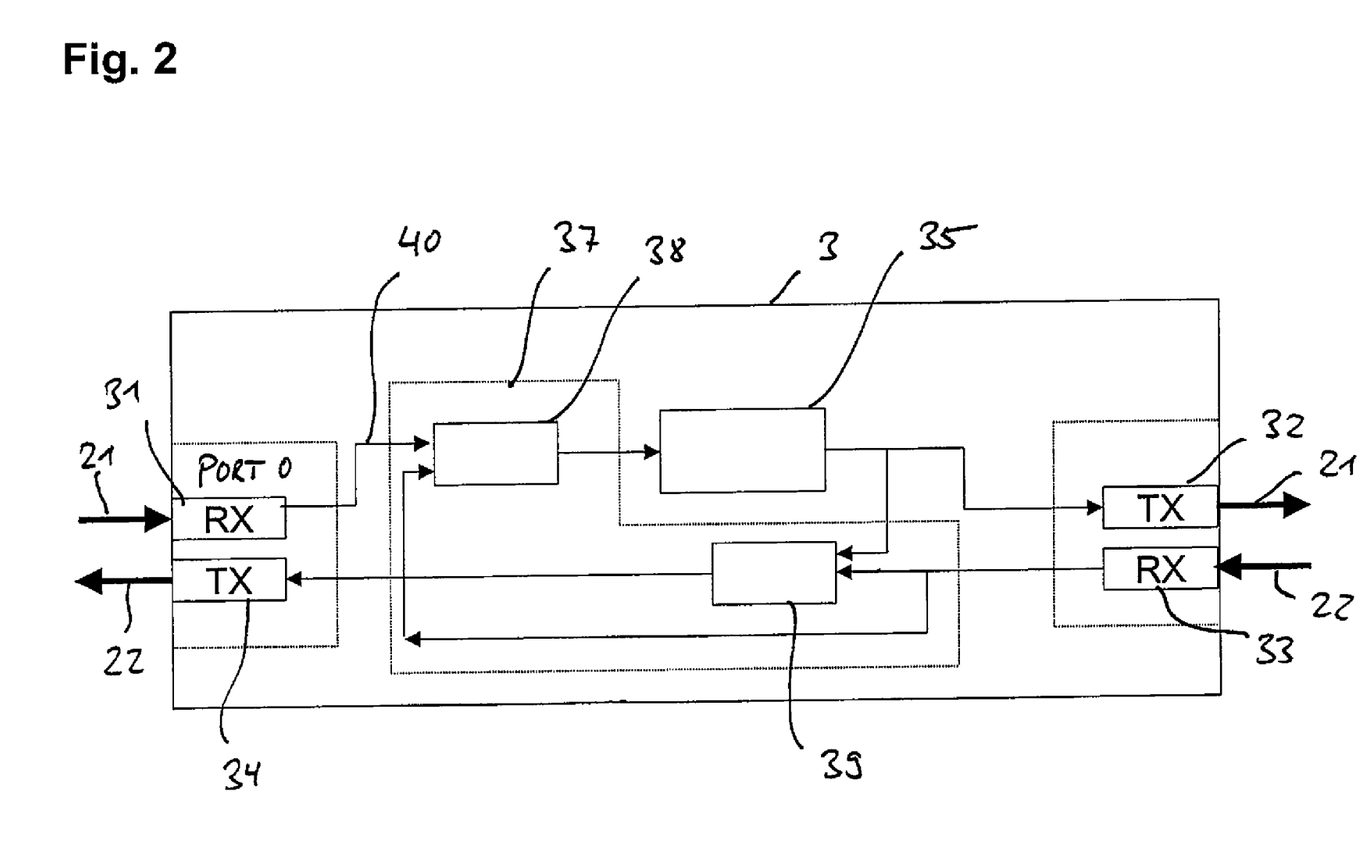
FIG. 2 shows a schematic view of a slave unit according to the present invention.

The basic circuit diagram of a slave unit 3 is shown in more detail in FIG. 2. In the slave unit 3, the first receiving unit RX31 which is connected to the first communication path 21, and the second transmitting unit TX34 which is connected to the second communication path 22, are grouped as port 0. The second receiving unit RX33 which is connected to a second communication path 22, and the first transmitting unit TX32, which is connected to the first communication path 21, are organized as port 1.

The actuable coupling device 37 comprises a first change-over switch 38 and a second change-over switch 39, which are designed as 2-1-multiplexers, respectively. The receiving and transmitting units 31, 32, 33, 34, the multiplexers 38, 39 of the actuable coupling unit 37 and the processing unit 35 are in this arrangement interconnected by a line network 40 in the manner shown by arrows in FIG. 2.

The output of the first receiving unit RX31 is connected to the first input of the first multiplexer 38. The second input of the first multiplexer 38 is connected to the second receiving unit RX33. The output of the first multiplexer 38 is furthermore connected to the processing unit 35. The second multiplexer 39 is in turn connected to the second receiving unit RX33 by its first input and to the output of the processing unit 35 by its second input. The output of the second multiplexer 39 is connected to the second receiving unit TX34. Moreover, the output of the processing unit 35 is connected to the first transmitting unit TX32 via the line network 40.

Figure 1A:
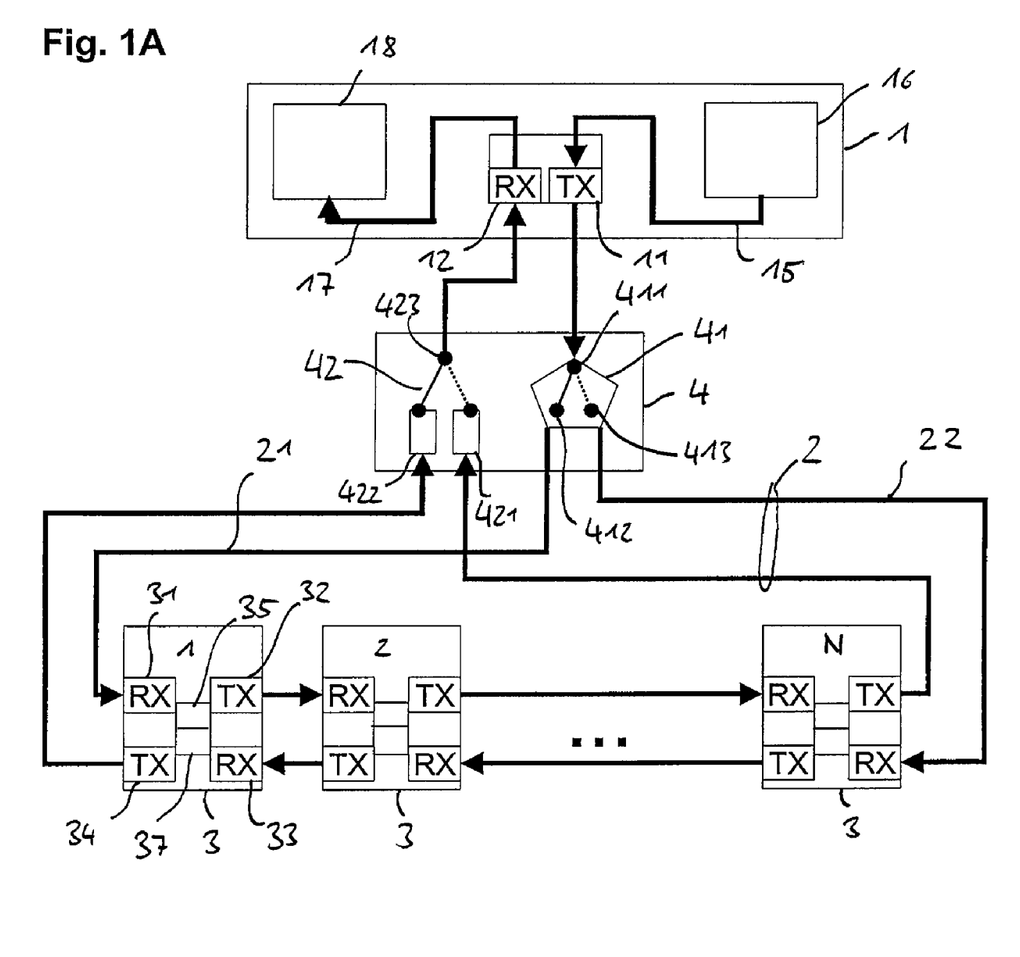
FIG. 1A shows the normal mode.

During a failure-free normal mode of the communication system as shown in FIG. 1A, an identical Ethernet message is outputted to the first communication path 21 and to the second communication path 22, respectively. In this process, the messages pass through the connected slave units 3 in contra-sense direction, all actuable coupling units 37 in the slave units 3 being connected in such a way that the input of the processing unit 35 is connected to the first receiving unit RX31, the output of the processing unit 35 is connected to the first transmitting unit TX32 and the second receiving unit RX33 is connected to the second transmitting unit TX34. In this operation mode of the slave units 3, the actuable coupling unit 37 provides that the two identical messages circulating in the first communication path 21 and in the second communication path 22 in contra-sense direction always pass through the slave unit in such a way that only the messages transmitted via the first communication path 21 are processed by the processing unit 35. The message circulating on the second communication path 22, on the other hand, is merely handed through the slave units 3.

In the inventive arrangement, during a failure-free normal mode the coupling unit 37 which can be activated and which consists of the two 2-1-multiplexers 38, 39 is controlled in such a way that of the two identical messages, which circulate on the two communication paths 21, 22 simultaneously, but in contra-sense direction, always only the message on the first communication path 21 is forwarded for processing by the processing unit 35 of the slave units 3. The message passing through the second communication path 22 is provided for redundancy and is back-fed without modification. The inventive communication system comprising a master-slave structure, in which the slave units are serially connected to the master unit via an interface element and two double ring structures operating in contra-sense direction, only one single processing unit 35 being provided in each slave unit 3, in the case of a disturbance, i.e. on occurrence of a link fault, has the capability of reconfiguring the communication paths in the individual slave units in order to maintain the performance of the entire communication system.

Figure 1B:
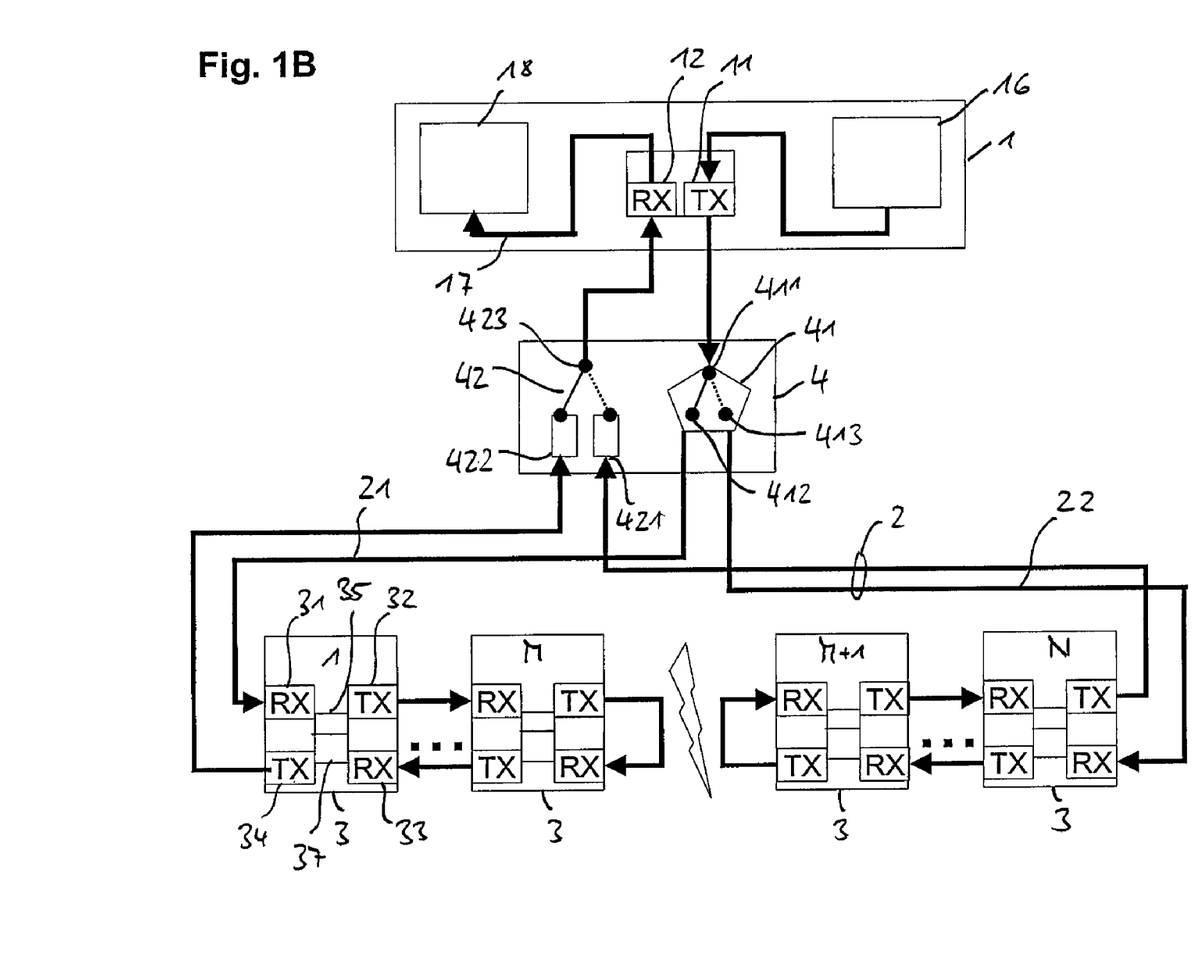
FIG. 1B shows a first communication system reconfiguration on the occurrence of a link fault.
Figure 1C:
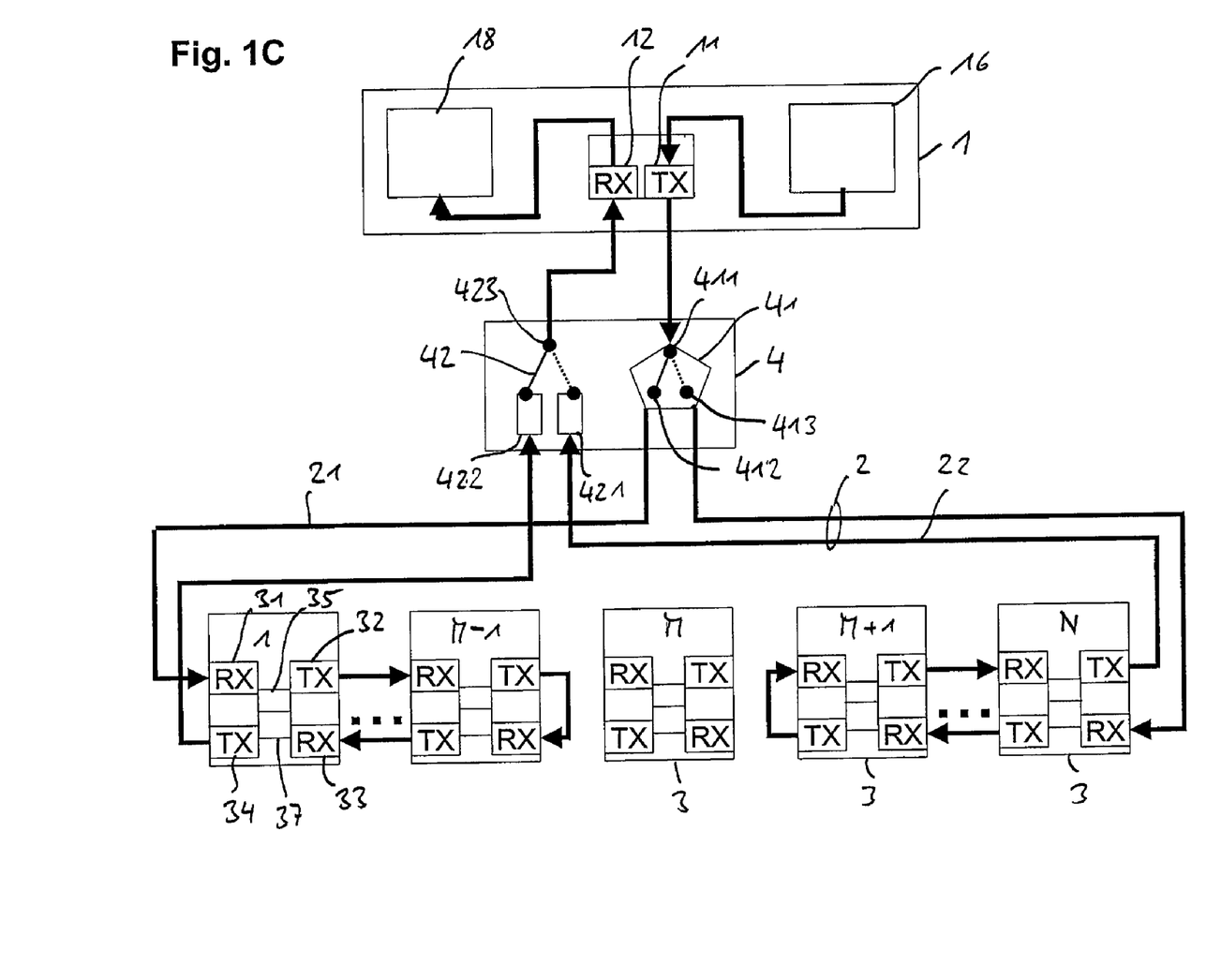
FIG. 1C shows a second communication system reconfiguration in the case of the failure of a slave unit.

FIG. 1B shows a double link fault between the slave unit M and the slave unit M+1. FIG. 1C represents a complete failure of the slave unit M which is equivalent to the occurrence of two double link faults, one between the slave unit M−1 and the slave unit M and between the slave unit M+1 and the slave unit M. When such a double link fault occurs, the actuable coupling device 37 of the slave units 3 is addressed in such a manner that the message arriving either on the first communication path 21 or on the second communication path 22 is fed back to the master unit 1 on the other communication path in each case, the message first always passing through the processing unit 35 of the slave unit 3.

In the case of the double link fault between the slave unit M and the slave unit M+1, shown in FIG. 1B, this occurs in such a manner that the slave units 1 to M−1 and M+2 to M are in normal mode whereas the slave units M and M+1 are reconfigured. In the fault case shown in FIG. 1C, in which the slave unit M completely fails, the slave units 1 to M−2 and the slave units M+2 to M are in normal mode. The slave units M−1 and M+1, in contrast, are reconfigured. Herein, the reconfiguration may be triggered by the two ports and 1 in the slave units 3. These two ports 0 and 1 detect by means of a known detection process whether the slave unit can communicate with an adjoining slave unit. If a link fault is detected by port 0 or port 1, a corresponding fault mode is then carried out and the actuable coupling device 34 of the slave unit is addressed in the desired manner.

In the case of a fault mode of port 1 as occurs in the double link fault shown in FIG. 1B in the slave unit M and in the device failure shown in FIG. 1C in the slave unit M−1, the actuable coupling device 37 is addressed in such a manner that the input of the processing unit 35 is connected to the first receiving unit RX31 and the output of the processing unit 35 is connected to the second transmitting unit TX34. The message circulating on the first communication path 21 is thus fed back to the second communication path 22 via the processing unit 35. In the case of the design of the actuable coupling device 37 shown in FIG. 2 in the slave unit 3 with the first multiplexer 38 and the second multiplexer 39, this occurs in such a manner that the second input of the second multiplexer 39 is connected to its output. The first multiplexer 38, on the other hand, remains in normal mode.

In the case of a fault mode of port 0 in the slave unit 3, i.e. when the first receiving unit RX31 and/or the second transmitting unit TX34 detect an interruption of the communication path to the adjacent slave unit which occurs in the case of the double link fault shown in FIG. 1B in slave M+1 and in the device failure shown in FIG. 1C in slave M+1, the actuable coupling device 37 in the slave unit 3 is driven in such a manner that the input of the processing unit 35 is connected to the second receiving unit RX33 and the output of the processing unit 35 is connected to the first transmitting unit TX32 so that the message passing through on the second communication path 22, after processing in the processing unit 35, is fed back on the first communication path 21. In the embodiment shown in FIG. 2 of the actuable coupling device 35, this occurs in such a manner that the first multiplexer 38 switches its second input to its output whereas the second multiplexer 39 remains in normal mode.

The procedure according to the invention thus allows for reconfiguration measures in the communication system in a slave unit having only one processing unit, by means of the aid of a double-ring structure and an actuable coupling device in a simple manner in order to ensure the performance of the communication system in the case of a link fault, the behavior of the slave units with respect to message processing in the redundancy case not differing from that in normal mode.

Apart from the double link fault shown in FIGS. 1B and 1C, in which the two communication paths to the adjacent user are interrupted, the procedure according to the invention also allows for single link faults, in which only one communication path is interrupted, to be detected and to maintain the performance of the communication system by correspondingly reconfiguring the users adjoining the fault location.

In the slave units 3, only one processing unit 35 is also always provided so that, in comparison with slave units having two processing units, no decision needs to be made about which processing unit is responsible for message processing.

To achieve a high fault tolerance of the communication system with low hardware expenditure, particularly also in the master unit 1, the processing of the messages circulating in contra-sense on the first communication path 21 and the second communication path 22 is carried out in such a manner that the processing during fault-free normal mode does not significantly differ from that in the case of a fault mode in which the performance of the communication system is maintained by reconfiguring the individual slave units in the case of link faults. The slave unit can be designed in the manner according to the invention. However, the possibility also exists to use slave units having a different switching configuration which can be used as part of a master-slave system having a double-ring structure.

According to the invention, it is furthermore possible to use a master-slave unit 1 comprising only one transmitting unit TX11 and one receiving unit RX12, as it is also used in the operation of a single ring structure, for controlling the fault-tolerant double-ring structure. This is achieved by interposing the inventive interface unit 4, the first switching unit 41 of which is configured to output a message received via the input 411 by the transmitting unit TX11 of the master unit 1 in contra-sense direction via the first output 412 and the second output 413 to the first communication path 21 or to the second communication path 22, respectively. The second switching unit 42 of the interface unit 4 is in turn configured in such a manner that the contra-sense messages received from the first communication path 21 via the first input 421 and from the second communication path 22 via the second input 422 are forwarded to the receiving unit RX12 of the master unit 1 via the output 423.

In order to achieve a high fault tolerance, according to the invention an identical message is outputted to the first communication path 21 as well as to the second communication path 22. According to an embodiment, this is achieved by the transmission control unit 16 of the master unit 1 transmitting two messages having an identical data field, which comprises an associated data area for each connected slave unit, and a different address field to the first switching unit 41 of the interface unit via the transmitting unit TX11. The first switching unit 41 of the interface unit 4 is then configured in such a way that one message is outputted to the first communication path 21 and the other message is outputted to the second communication path 22 on the basis of the contents of the address field. Thereby, in the simplest case, the address field may be a 1 bit field, the two communication paths 21, 22 being characterized by "0" or "1", respectively.

While the message passes through, the processing units 35 of the slave units 3 then process the data area associated with the respective slave unit, the processing unit 35 in normal mode as well as in failure mode only ever processing the associated data area in one of the two identical messages circulating in contra-sense in the above-described inventive manner.

The second switching unit 42 of the interface unit 4 is then configured in such a way that the two messages passing through the first communication path and the second communication path 21 in contra-sense direction are forwarded to the receiving unit RX12 of the master unit 1. For this purpose, the second switching unit 42 of the interface unit 4 may comprise a FIFO mechanism in which the messages received via the two inputs 421, 422 are fed in. The two messages are then forwarded from the FIFO mechanism to the receiving unit RX12 of the master unit 1 via the output 423 of the interface unit 4. By using the FIFO mechanism, a possible collision during the feedback of the messages to the master unit 1 is prevented. In the master unit 1 the two received messages are forwarded to the receiving control unit 18 and are superimposed there in order to produce one single message. This may be carried out by OR-ing the useful data of both messages bit by bit.

Alternatively, it is also possible to configure the interface unit 4 in an intelligent manner. In this case, a message applied to the interface unit 4 by the transmission control unit 16 via the transmitting unit TX11 is doubled in the first switching unit 41 and then the one message is outputted on the first communication path 21 and the other information signal is outputted on the second communication path 22. The processing unit 35 in the slave units 3 then processes the associated data area in one of the two circulating messages. The two messages are then received via the first and the second input 421, 422 of the second switching unit 42 of the interface unit 4, and superimposed. This, in turn, may be carried out by OR-ing the useful data of both messages bit by bit. The resulting message is forwarded from the second switching unit 42 via the output 423 to the receiving unit RX12 of the master unit 1, which in turn applies the message to the receiving control unit 18 for evaluation.

In order to determine disturbances in the communication system, in particular when reconfiguring the communication system by switching individual slave units into the failure mode upon occurrence of a link fault or a total failure of a slave unit, respectively, the circulating messages additionally comprise a counter field, the value of which is evaluated, may be added up in order to determine the operating status of the communication system. The two circulating identical messages which, as explained above, are either generated by the transmission control unit 16 of the master unit 1 and provided with an address field, on the basis of which the first switching unit 41 of the interface unit 4 outputs the one message to the first communication path 21 and the other message to the second communication path 22, or which are generated by the first switching unit 41 of the interface unit 4 by duplicating a message received from the master unit and outputted to the first communication path 21 and the second communication path 22 for separate contra-sense transmission, comprise a predetermined value in the counter field. The processing unit 35 of the slave units 3 are furthermore configured in such a way that the value of the counter field is changed by a predetermined value when the messages pass through.

Subsequently, when the second switching unit 42 of the interface unit 4 forwards the two received messages only to the master unit 1, the respective value of the counter field of the two messages is evaluated in the receiving control unit 18 of the master unit 1. By simply adding up the two values it may be determined whether all connected slave units are active. Alternatively, it is possible in an intelligent configuration of the interface unit 4, if the received messages are already OR-ed in the second switching unit 42, to carry out the merging of the counter fields of both messages in the second switching unit 42 of the interface unit 4 for example by adding up. The added-up value is then transmitted to the master unit 1 together with the OR-ed message for evaluation.

As an initial value, the counter field of the two messages may be set to 0. Each processing unit 35 then increases the value by the predetermined value, e.g. by the value 1, while the message is passing through the slave unit 3. Since by means of the inventive configuration of the slave units in normal mode as well as in failure mode only one message may ever be processed by the processing unit 35, the added-up value of the counter fields may indicate the number of active slave units. Thus, it may be determined whether all associated slave units are active or if a total failure of a slave unit, e.g. caused by a double link fault, as shown in FIG. 1C, has occurred. Moreover, by comparing the values in the two counter fields on the basis of the known number of associated slave units, the precise position of the link fault, e.g. the occurrence between the slave unit M and the slave unit M+1 in FIG. 1B may be determined.

A fault-tolerant operation of the communication system, in particular when reconfiguring the communication system by modifying the signal routing in the slave units 3 when a link fault occurs is moreover achieved by configuring the two identical messages circulating on the first communication path 21 and the second communication path 22 in contra-sense direction in such a manner that an appropriate data area may be assigned in the data field of each connected slave unit 3. The processing unit 35 of each slave unit 3 carries out a data exchange in the associated data area with the circulating message. In the second switching unit 42 of the interface unit 4 or in the receiving control unit 18 of the master unit 1, the data fields of the two messages back-fed via the first and the second communication path are then superimposed, resulting in a shared message. This superimposed message is always the same, regardless of the communication system being in normal mode or in failure mode upon occurrence of a link fault, provided that all slave units are still active.

In read mode, when the slave units 3 transmit data to the master unit 1, the entire data field of the two messages circulating in contra-sense direction is set to 0 as an initial value. The processing units 35 of the slave units 3 write the desired data into the associated data area. The receiving control unit 18 of the master unit 1 or the second switching unit of the interface unit 4 successively ORs the data fields of the two received messages in order to form a shared message. Regardless of whether the communication system is in normal mode or in reconfiguration mode, the ORed message contains all data of the connected slave units 3 requested by the master unit 1.

In write mode, in contrast, when the master unit 1 wishes to transmit control commands to the slave units 3, the transmission control unit 16 of the master unit 1 transfers two identical messages having a data field which contains the data to be transmitted to the slave units, for contra-sense transmission on the two communication paths. Alternatively, the message is duplicated by an intelligent interface unit only in the first switching unit 41. The processing units 35 of the slave units 3 then extract the associated data from the message regardless of whether they are in normal mode or in reconfiguration mode. In principle, ORing of the data fields of the two back-fed messages is not required. Such an OR-ing process, however, results in a shared message having a data field corresponding to the data field of the transmitted message, thus resulting in an additional control means for a successful write mode.

Given the configuration of the master-slave communication system comprising an interposed interface unit according to the invention, the possibility exists for the master unit, with an arbitrary arrangement of the individual slave units, but particularly if the slave units are arranged and operated in the manner according to the invention, to determine, in a simple manner, the freedom of faults in the communication system particularly in the case of a reconfiguration of the signal routing in the double-ring structure after occurrence of a link fault. Furthermore, a reliable read operation is guaranteed in the communication system even in the redundant case, that is to say when individual slave units in the communication system have switched to fault mode, by superimposing the data fields of the two back-fed messages. The use of the interface unit thereby allows for utilizing conventional master units with only one transmitting or receiving unit, respectively, as is also the case in a single ring structure.

The invention provides an interface for a communication system having a master-slave structure for serially connecting a master unit to a plurality of slave units via a double-ring structure and a respective communication system which have a minimal hardware and switching complexity and enable a reconfiguration in real-time if link faults occur in the double-ring topology.

According to an embodiment, an interface for a communication system having a master-slave structure is provided, serially connecting a master unit to a plurality of slave units via a contra-sense double-ring structure consisting of a first communication path and of a second communication path. The interface unit thereby comprises a first switch unit, the input of which is connected to a transmitting unit of the master unit, the first output of which is connected to the first communication path and the second output of which is connected to the second communication path, the switch unit being configured to output an information signal received by the transmitting unit of the master unit to the first communication path and to the second communication path for separate contra-sense transmission. Furthermore, the interface unit provides a second switch unit, the first input of which is connected to the first communication path, the second input of which is connected to the second communication path and the output of which is connected to a receiving unit of the master unit, the second switch unit being configured to forward the two information signals circulating on the first communication path and the second communication path in contra-sense direction to the receiving unit of the master unit.

By means of this arrangement of the interface between the master unit and the slave units in a fault-tolerant communication system having a double ring topology, hardware and software complexity and thus costs may be considerably reduced. By using an interface unit configured in the inventive manner, it is possible to use a conventional master unit, as it is used in a single ring architecture and which only comprises a transmitting and receiving unit, even in a double ring structure. The inventive interface unit provides that even by means of a master unit conceived for a single ring structure, data packets may circulate on the two contra-sense communication paths of the double ring structure.

According to another embodiment, the interface unit is configured intelligently in such a manner that it duplicates an information signal received by the transmitting unit of the master unit for separate contra-sense transmission on the first and the second communication paths of the double ring structure. By transmitting two identical data packets on the two contra-sense communication paths, a high fault tolerance with regard to link faults is achieved within the double ring structure.

This also applies for a further embodiment in which the first switching unit of the interface unit is configured in such a way that an address information is evaluated within the information signal received by the transmitting unit of the master unit in order to alternately transmit the information signal on the first communication path and on the second communication path. This configuration allows for two identical and thus redundant information signals to pass through the double ring structure in contra-sense direction, thus ensuring high fault tolerance.

According to another embodiment, the second switching unit of the interface unit is configured to evaluate the two contra-sense information signals circulating on the first and second communication path. This guarantees the performance of the communication system in an easy manner, particularly in the case of redundancy, i.e. if the communication systems are reconfigured due to a link failure and individual slave units are switched to failure mode.

Alternatively, however, the second switching unit of the interface unit may also be configured in such a way that the two data packets received on the first and the second communication path are successively forwarded to the receiving unit of the master unit for evaluation. The redundancy when a failure occurs will then be achieved by an evaluation within the master unit instead of an evaluation within the interface unit. The second switching unit of the interface unit may comprise a FIFO mechanism in order to thus avoid collisions of the information signals successively back-fed to the master unit.

According to another embodiment, communication by means of the master-slave structure is configured in such a way that the master unit comprises a transmitting control unit which transmits two information signals having an identical data field, which may comprise an associated data area for each connected slave unit, and having a different address field to the first switching unit of the interface unit via the transmitting unit of the master unit. The first switching unit of the interface unit is further configured in such a way that on the basis of the contents of the address field one information signal is outputted on the first communication path and the other information signal is outputted on the second communication path. In each slave unit arranged within the double ring structure, an actuable coupling unit is provided which in normal mode connects the input of a processing unit to a first receiving unit, the output of the processing unit to a first transmitting unit and a second receiving unit to a second transmitting unit. In case of a fault within the first transmitting unit and/or the second receiving unit, the input of the processing unit is then connected to the first receiving unit and the output of the processing unit is connected to the second receiving unit. In the case of a fault in the first receiving unit and/or the second transmitting unit, on the other hand, the input of the processing unit is connected to the second receiving unit and the output of the processing unit is connected to the first transmitting unit. The processing unit of each slave unit is furthermore configured in such a way that during processing of the information signals passing through, the data area associated to the slave unit is processed. In the second switching unit of the interface unit, the two information signals passing in contra-sense direction are successively forwarded to the receiving unit of the master unit, a receiving control unit of the master unit being configured to superimpose the data fields of the two information signals received from the receiving unit. By means of this arrangement, a highly fault-tolerant communication system is formed in a simple manner since upon the occurrence of link faults the communication system may be rapidly reconfigured by changing the path of the data packet in the adjacent slave units, the two redundant data packets passing through within the receiving control unit of the master unit being superimposed in order to reliably avoid a loss of information even in failure operation.

Alternatively, such a fault tolerance in the communication system may also be achieved by using an intelligent interface which duplicates an information signal received by the transmitting unit of the master unit, the two data packets passing through being superimposed upon receipt by the interface unit in order to thus reliably avoid a loss of data during the failure mode of the slave units.

In order to monitor if the communication system is failure-free, in particular during reconfiguration of the communication system after a link fault has occurred, according to a further embodiment the information signals comprise an additional counter field, which has been set to a predetermined value, the counter field being modified by a predetermined value by the processing unit of the slave unit while passing through. The second switching unit of the interface unit or alternatively the receiving control unit of the master unit add up the value of the counter fields of the two information signals passing through in contra-sense direction. By evaluating this value it can then be determined if link faults in the communication system have occurred or if a slave unit has failed, respectively.

The preceding description describes embodiments of the invention. The features disclosed therein and the claims and the drawings can, therefore, be useful for realizing the invention in its various embodiments, both individually and in any combination. While the foregoing is directed to embodiments of the invention, other and further embodiments of this invention may be devised without departing from the basic scope of the invention, the scope of the present invention being determined by the claims that follow.

What is claimed is:

1. An interface unit for a communication system comprising a master unit and a plurality of slave units serially connecting the master unit via a double ring structure comprising a first communication path and a second communication path, the first transmission path comprising a first transmission line and the second transmission path comprising a second transmission line,
the interface unit comprising a first switching unit, which is configured to output information signals received by the master unit as a first information signal to the first communication path and as a second information signal to the second communication path, and a second switching unit, which is configured to forward the first information signal circulating on the first communication path and second information signal circulating on the second communication path to the master unit,
wherein an input of the first switching unit is connected to a transmitting unit of the master unit, a first output of the first switching unit is directly connected to the first transmission line of the first communication path and a second output of the first switching unit is directly connected to the second transmission line of the second communication path, and wherein a first input of the second switching unit is directly connected to the first transmission line of the first communication path, a second input of the second communication path is directly connected to the second transmission line of the second communication path and an output of the second switching unit is connected to a receiving unit of the master unit.

2. The interface unit of claim 1, the first switching unit being configured to duplicate an information signal received by the master unit for separate transmitting as the first information signal on the first communication path and as the second information signal on the second communication path.

3. The interface unit of claim 1, the first switching unit being configured to evaluate an address information of an information signal received by the master unit as the first information signal on the first communication path or as the second information signal on the second communication path.

4. The interface unit of claim 1, the second switching unit being configured to evaluate the first information signal circulating on the first communication path and second information signal circulating on the second communication path.

5. The interface unit of claim 1, the second switching unit being configured to successively forward the first information signal circulating on the first communication path and second information signal circulating on the second communication path to the master unit.

6. The interface unit of claim 5, the second switching unit comprising a FIFO mechanism.

7. The interface unit of claim 1, the first communication path and the second communication path operating in a contra-sense manner.

8. An interface unit for a communication system comprising a master-slave structure for serially connecting a master unit to a plurality of slave units via a double ring structure formed of a first communication path and a second communication path, the first transmission path comprising a first transmission line and the second transmission path comprising a second transmission line, and operating in a contra-sense manner,
comprising a first switching unit, an input of which is connected to a transmitting unit of the master unit, a first output of which is directly connected to the first transmission line of the first communication path and a second output of which is directly connected to the second transmission line of the second communication path and which is configured to output an information signal received by the transmitting unit of the master unit for separate contra-sense transmitting to the first communication path and to the second communication path, and
comprising a second switching unit, a first input of which is directly connected to the first transmission line of the first communication path, a second input of which is directly connected to the second transmission line of the second communication path and an output of which is connected to a receiving unit of the master unit and which is configured to forward the two information signals circulating on the first communication path and on the second communication path in contra-sense to the receiving unit of the master unit.

9. The interface unit of claim 8, the first switching unit being configured to duplicate an information signal received by the transmitting unit of the master unit for separate contra-sense transmitting on the first communication path and on the second communication path.

10. The interface unit of claim 8, the first switching unit being configured to evaluate an address information in the information signal received by the transmitting unit of the master unit for transmitting the information signal on the first communication path or on the second communication path.

11. The interface unit of claim 8, the second switching unit being configured to evaluate the two information signals circulating in contra-sense on the first communication path and on the second communication path.

12. The interface unit of claim 8, the second switching unit being configured to successively forward the two information signals circulating in contra-sense on the first communication path and on the second communication path to the receiving unit of the master unit.

13. The interface unit of claim 12, the second switching unit comprising a FIFO mechanism.

14. A communication system comprising a master unit, a plurality of slave units, a double ring structure comprising a first communication path and a second communication path, and an interface unit for serially connecting the master unit to a plurality of slave units via the double ring structure, the master unit comprising a transmitting unit for transmitting information signals and a receiving unit for receiving information signals, the interface unit comprising a first switching unit, an input of which is connected to the transmitting unit of the master unit, a first output of which is connected to the first communication path and a second output of which is connected to the second communication path, and a second switching unit, a first input of which is connected to the first communication path, a second input of which is connected to the second communication path and an output of which is connected to the receiving unit of the master unit, each slave unit comprising a processing unit for processing information signals, the master unit being configured to transmit two information signals having an identical data field, which may be provided with an associated data area for each connected slave unit, and a different address field to the first switching unit of the interface unit via the transmitting unit, the first switching unit of the interface unit being configured to output the one information signal to the first communication path and the other information signal to the second communication path on the basis of the contents of the address field, the processing unit of each slave unit being configured to process the associated data area of the one information signal circulating on the first communication path or the associated data area of the other information signal circulating on the second communication path, the second switching unit of the interface unit being configured to successively forward the two information signals circulating in contra-sense on the first communication path and on the second communication path to the receiving unit of the master unit, and the master unit being configured to superimpose the data fields of the two information signals received by the receiving unit.

15. The communication system of claim 14, the master unit being configured to additionally provide the two information signals with a counter field set to a predetermined value, the processing unit of the slave unit being configured to modify the value of the counter field by a predetermined value while the information signal is passing through, and the master unit being configured to respectively evaluate the value of the counter field of the two information signals received by the first receiving unit.

16. The communication system of claim 15, the master unit being configured to add up the value of the counter fields of the received information signals.

17. A communication system having a master-slave structure, comprising a master unit, a plurality of slave units, a double ring structure formed by a first communication path and a second communication path operating in contra-sense, and an interface unit for serially connecting the master unit to a plurality of slave units via the double ring structure, the master unit comprising a transmitting unit for transmitting information signals, a receiving unit for receiving information signals, a transmission control unit connected to the transmitting unit and a receiving control unit connected to the receiving unit, the interface unit comprising a first switching unit, an input of which is connected to the transmitting unit of the master unit, a first output of which is connected to the first communication path and a second output of which is connected to the second communication path, and a second switching unit, a first input of which is connected to the first communication path, a second input of which is connected to the second communication path and an output of which is connected to the receiving unit of the master unit, each slave unit comprising a first receiving unit connected to the first communication path for receiving information signals on the first communication path, a first transmitting unit connected to the first communication path for transmitting information signals on the first communication path, a second receiving unit connected to the second communication path for receiving information signals on the second communication path and a second transmitting unit connected to the second communication path for transmitting information signals on the second communication path, a processing unit comprising an input and an output for processing information signals and an actuable coupling unit, the transmission control unit of the master unit being configured to transmit two information signals having an identical data field, which may be provided with an associated data area for each connected slave unit, and a different address field to the first switching unit of the interface unit via the transmitting unit, the first switching unit of the interface unit being configured to output the one information signal to the first communication path and the other information signal to the second communication path on the basis of the contents of the address field, the actuable coupling unit of each slave unit being configured to connect the input of the processing unit to the first receiving unit in normal operating mode, to connect the output of the processing unit to the first transmitting unit and the second receiving unit to the second transmitting unit, to connect the input of the processing unit to the first receiving unit and the output of the processing unit to the second transmitting unit in a failure mode of the first transmitting unit and/or of the second receiving unit, and to connect the input of the processing unit to the second receiving unit and the output of the processing unit to the first transmitting unit in a failure mode of the first receiving unit and/or the second transmitting unit, the processing unit of each slave unit being configured to process the associated data area while processing the information signal passing through, the second switching unit of the interface unit being configured to successively forward the two information signals circulating in contra-sense on the first communication path and on the second communication path to the receiving unit of the master unit, and the receiving control unit of the master unit being configured to superimpose the data fields of the two information signals received by the receiving unit.

18. The communication system of claim 17, the transmission control unit of the master unit being configured to additionally provide the two information signals with a counter field set to a predetermined value, the processing unit of the slave unit being configured to modify the value of the counter field by a predetermined value while the information signal is passing through, and the receiving control unit of the master unit being configured to respectively evaluate the value of the counter field of the two information signals received by the first receiving unit.

19. The communication system of claim 18, the receiving control unit of the master unit being configured to add up the value of the counter fields of the received information signals.

20. The communication system of claim 17, the second switching unit comprising a FIFO mechanism.

21. The communication system of claim 17, the actuable coupling unit of the slave unit comprising a first multiplexer, a first input of which is connected to the first receiving unit, a second input of which is connected to the second receiving unit and an output of which is connected to an input of the processing unit, and a second multiplexer, a first input of which is connected to the second receiving unit, a second input of which is connected to an output of the processing unit and an output of which is connected to the second transmitting unit, the first multiplexer being configured to switch its first input to its output in normal operation mode and to switch its second input to its output in a failure mode of the first receiving unit and/or of the second transmitting unit, and the second multiplexer being configured to switch its first input to its output in a normal operation mode and to switch its second input to its output in a failure mode of the first transmitting unit and/or of the second receiving unit.

22. The communication system of claim 17, the first transmitting unit and the second transmitting unit and/or the first receiving unit and the second receiving unit of the slave unit being configured to determine a link fault in the connected communication path and to trigger a corresponding failure mode.

23. A communication system comprising a master unit, a plurality of slave units, a double ring structure comprising a first communication path and a second communication path, the first transmission path comprising a first transmission line and the second transmission path comprising a second transmission line, and an interface unit for serially connecting the master unit to a plurality of slave units via the double ring structure,
the master unit comprising a transmitting unit for transmitting information signals and a receiving unit for receiving information signals,
the interface unit comprising a first switching unit, an input of which is connected to the transmitting unit of the master unit, a first output of which is directly connected to the first transmission line of the first communication path and a second output of which is directly connected to the second transmission line of the second communication path, and a second switching unit, a first input of which is directly connected to the first transmission line of the first communication path, a second input of which is directly connected to the second transmission line of the second communication path and an output of which is connected to the receiving unit of the master unit,
each slave unit comprising a processing unit for processing information signals,
the master unit being configured to send an information signal having a data field, which provides an associated data area for each connected slave unit to the first switching unit of the interface unit via the transmitting unit,
the first switching unit of the interface unit being configured to duplicate the information signal received by the master unit and to output the one information signal to the first communication path and the other information signal to the second communication path, the processing unit of each slave unit being configured to process the associated data area of the one information signal circulating on the first communication path or the associated data area of the other information signal circulating on the second communication path,
the second switching unit of the interface unit being configured to successively forward the two information signals circulating in contra-sense on the first communication path and on the second communication path to the receiving unit of the master unit, and
the master unit being configured to superimpose the data fields of the two information signals received by the receiving unit.

24. The communication system of claim 23, the master unit being configured to additionally provide the information signal with a counter field set to a predetermined value,
the processing unit of the slave unit being configured to modify the value of the counter field by a predetermined value while the information signal is passing through,
the second switching unit of the interface unit being configured to add up the value of the counter fields of the received information signals when the information signals are superimposed, and
the master unit being configured to respectively evaluate the value of the counter field of the information signal received by the receiving unit.

25. A communication system having a master-slave structure, comprising a master unit, a plurality of slave units, a double ring structure formed by a first communication path and a second communication path operating in contra-sense, the first transmission path comprising a first transmission line and the second transmission path comprising a second transmission line, and an interface unit for serially connecting the master unit to a plurality of slave units via the double-ring structure,
the master unit comprising a transmitting unit for transmitting information signals, a receiving unit for receiving information signals, a transmission control unit connected to the transmitting unit and a receiving control unit connected to the receiving unit,
the interface unit comprising a first switching unit, an input of which is connected to the transmitting unit of the master unit, a first output of which is directly connected to the first transmission line of the first communication path and a second output of which is directly connected to the second transmission line of the second communication path, and a second switching unit, a first input of which is directly connected to the first transmission line of the first communication path, a second input of which is directly connected to the second transmission line of the second communication path and an output of which is connected to the receiving unit of the master unit,
each slave unit comprising a first receiving unit connected to the first communication path for receiving information signals on the first communication path, a first transmitting unit connected to the first communication path for sending information signals on the first communication path, a second receiving unit connected to the second communication path for receiving information signals on the second communication path and a second transmitting unit connected to the second communication path for sending information signals on the second communication path, a processing unit comprising an input and an output for processing information signals and an actuable coupling unit,
the transmission control unit of the master unit being configured to send an information signal having a data field, which provides an associated data area for each connected slave unit to the first switching unit of the interface unit via the transmitting unit, the first switching unit of the interface unit being configured to duplicate the information signal received by the transmitting unit of the master unit and to output the one information signal to the first communication path and the other information signal to the second communication path, the actuable coupling unit of each slave unit being configured to connect the input of the processing unit to the first receiving unit in normal operating mode, to connect the output of the processing unit to the first transmitting unit and the second receiving unit to the second transmitting unit, to connect the input of the processing unit to the first receiving unit and the output of the processing unit to the second transmitting unit in a failure mode of the first transmitting unit and/or of the second receiving unit, and to connect the input of the processing unit to the second receiving unit and the output of the processing unit to the first transmitting unit in a failure mode of the first receiving unit and/or the second transmitting unit, the processing unit of each slave unit being configured to process the associated data area while processing the information signal passing through, the second switching unit of the interface unit being configured to superimpose the data fields of the two information signals circulating in contra-sense on the first communication path and on the second communication path and to forward them to the receiving unit of the master unit, and the receiving control unit of the master unit being configured to evaluate the information signal received from the receiving unit.

26. The communication system of claim 25, the transmission control unit of the master unit being configured to additionally provide the information signal with a counter field set to a predetermined value, the processing unit of the slave unit being configured to modify the value of the counter field by a predetermined value while the information signal is passing through, the second switching unit of the interface unit being configured to add up the value of the counter fields of the received information signals when the information signals are superimposed, and the receiving control unit of the master unit being configured to respectively evaluate the value of the counter field of the information signal received by the receiving unit.

27. The communication system of claim 25, the second switching unit comprising a FIFO mechanism.

28. The communication system of claim 25, the actuable coupling unit of the slave unit comprising a first multiplexer, a first input of which is connected to the first receiving unit, a second input of which is connected to the second receiving unit and an output of which is connected to the input of the processing unit, and a second multiplexer, a first input of which is connected to the second receiving unit, a second input of which is connected to the output of the processing unit and an output of which is connected to the second transmitting unit, the first multiplexer being configured to switch its first input to its output in normal operation mode and to switch its second input to its output in a failure mode of the first receiving unit and/or of the second transmitting unit, and the second multiplexer being configured to switch its first input to its output in a normal operation mode and to switch its second input to its output in a failure mode of the first transmitting unit and/or of the second receiving unit.

29. The communication system of claim 25, the first transmitting unit and the second transmitting unit and/or the first receiving unit and the second receiving unit of the slave unit being configured to determine a link fault in the connected communication path and to trigger a corresponding failure mode.

* * * * *

UNITED STATES PATENT AND TRADEMARK OFFICE
CERTIFICATE OF CORRECTION

| | | Page 1 of 1 |
|---|---|---|
| PATENT NO. | : 8,001,306 B2 | |
| APPLICATION NO. | : 12/251028 | |
| DATED | : August 16, 2011 | |
| INVENTOR(S) | : Hans Beckhoff | |

It is certified that error appears in the above-identified patent and that said Letters Patent is hereby corrected as shown below:

| Column | Line | PTO | Should Read |
|---|---|---|---|
| 7 | 17 | the two ports and 1 | the two ports 0 and 1 |

Signed and Sealed this
Eleventh Day of October, 2011

David J. Kappos
*Director of the United States Patent and Trademark Office*